United States Patent
Kiyotoki et al.

(10) Patent No.: US 6,886,809 B2
(45) Date of Patent: *May 3, 2005

(54) JOINT CONSTRUCTION OF COBALT-BASED ALLOY

(75) Inventors: Yoshihisa Kiyotoki, Hitachinaka (JP); Mitsuo Chigasaki, Hitachi (JP); Shizuo Matsushita, Hitachi (JP); Jiro Kuniya, Hitachi (JP); Takahiko Kato, Hitachinaka (JP); Yoshiteru Chiba, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/669,529

(22) Filed: Sep. 25, 2003

(65) Prior Publication Data

US 2004/0056231 A1 Mar. 25, 2004

Related U.S. Application Data

(63) Continuation of application No. 10/083,355, filed on Feb. 27, 2002.

(30) Foreign Application Priority Data

Aug. 3, 2001 (JP) .................................... 2001-235707

(51) Int. Cl.$^7$ .......................... G12C 15/00; F16K 51/00
(52) U.S. Cl. ........................ 251/368; 137/375; 428/668
(58) Field of Search .......................... 251/368; 137/375; 376/352; 428/668

(56) References Cited

U.S. PATENT DOCUMENTS 4,648,308 A * 3/1987 Matsui et al. .................. 92/212
6,164,624 A 12/2000 Watanabe et al.
6,672,330 B2 * 1/2004 Chigasaki et al. .......... 137/375

FOREIGN PATENT DOCUMENTS

| JP | 59-179283 | 10/1984 |
| JP | 60-86239 | 5/1985 |
| JP | 06-126470 | 5/1994 |
| JP | 2000-246645 | 9/2000 |
| JP | 2000-273573 | 10/2000 |

OTHER PUBLICATIONS

"Section 3.4.3—Diffusion Welding", JSME Mechanical Engineers' Handbook, 1987 ed., B2, pp. 63–64.

U.S. Appl. No. 09/775,792, filed Feb. 5, 2001.

U.S. Appl. No. 09/939,591, filed Aug. 28, 2001.

* cited by examiner

Primary Examiner—Eric Keasel
(74) Attorney, Agent, or Firm—Mattingly, Stanger, Malur & Brundidge, P.C.

(57) ABSTRACT

In the joint construction of cobalt-based alloy, a cobalt-based alloy layer 1, in which granular or massive eutectic carbide 2 disperses, is joined to a metal of a base metal 37 via an insert metal layer 36. For the joint construction of cobalt-based alloy, liquid phase diffusion bonding is performed at a temperature of 1100° C. for a retention time of 1 hour with an insert metal with a thickness of about 40 μm being interposed between the base metal, which is S45C carbon steel, and a cobalt-based alloy material which has granular or massive eutectic carbide with a grain size not larger than 30 μm in a matrix of cast structure and contains 1.03 wt % C, 29.73 wt % Cr, 3.86 wt % W, 2.59 wt % Ni, 2.67 wt % Fe, 0.59 wt % Si, and 0.07 wt % Mo, the balance substantially being Co. The cobalt-based alloy layer 1 after bonding contains granular or massive eutectic carbide.

18 Claims, 10 Drawing Sheets

JOINT CONSTRUCTION OF COBALT-BASED ALLOY

This application is a continuation application of U.S. Ser. No. 10/083,355, filed Feb. 27, 2002. This application is related to U.S. Ser. No. 10/270,515, filed Oct. 16, 2002.

BACKGROUND OF THE INVENTION

1. Field of the Invention

The present invention relates to a joint construction of cobalt-based alloy. More particularly, it relates to a joint construction of cobalt-based alloy, which is well suited when it is applied to a valve and a rotating apparatus having a mechanical seal.

2. Description of the Related Art

As a technology for joining metals of the same kind or metals of different kinds, there are generally known a method in which a brazing filler metal is inserted between an anticorrosion and wear resisting alloy and a base metal to which the alloy is to be joined and only the brazing filler metal is melted and solidified, by which the alloy is joined to the base metal (brazing), a method in which a molten metal is supplied to a joint portion and a base metal to be joined is also melted, by which a layer in which the supplied metal and the base metal are both melted in the joint portion is formed (welding), and a method in which a very thin surface layer of a base metal is melted and a molten metal is deposited on the surface layer, by which the deposited metal is joined to the base metal (build-up).

Also, "Section 3.4.3 Diffusion Welding" in JSME Mechanical Engineers' Handbook, 1987 ed., B2-pp. 63–64 describes diffusion welding in which smooth surfaces of two metallic materials to be joined are brought into contact with each other, and the two metallic materials are joined to each other by a creep phenomenon (caused by the application of a high load) at the contact portion and sintering caused by high temperature in the state in which the metallic materials are maintained at a high temperature. Also, the aforementioned JSME Mechanical Engineers' Handbook describes, as one kind of diffusion welding, a joining method for joining different metals together that does not produce a joint interface, wherein an insert metal containing Ni is inserted between two metallic materials to be joined, and the metallic materials are joined to each other by applying a high load while the metallic materials are maintained at a high temperature. The insert metal is entirely diffused into the two metallic materials to be joined.

Japanese Patent Laid-Open No. 2000-273573 describes a method in which a Co-based, Ni-based, or Fe-based anticorrosion and wear resisting alloy having globular or granular eutectic carbide is joined to a base metal by brazing, welding, or diffusion welding.

The method of joining an anticorrosion and wear resisting alloy to a base metal, which is described in Japanese Patent Laid-Open No. 2000-273573, has problems described below.

In the method in which an anticorrosion and wear resisting alloy is joined to a base metal by melting a brazing filler metal, the metal joining force is weak, so that the joint portion comes off when the temperature increases again to the brazing temperature. According to other methods (welding or diffusion welding), since the metals to be joined are made in a molten state, the globular or granular eutectic carbide of the anticorrosion and wear resisting alloy changes to linear or net-form eutectic carbide. As a result, the characteristics obtained by the globular or granular eutectic carbide are lost. In diffusion welding, since a high load is applied to the metals to be joined at a high temperature at which a creep phenomenon takes place, a high residual stress is created, or a crack develops. Therefore, diffusion welding is unsuitable as a method in which a Co-based anticorrosion and wear resisting alloy having globular or granular eutectic carbide is joined to a base metal while the form thereof is maintained.

SUMMARY OF THE INVENTION

An object of the present invention is to provide a joint construction of cobalt-based alloy, which can exhibit characteristics of corrosion resistance and wear resistance of a cobalt-based alloy even after joining.

To achieve the above object, the present invention provides a joint construction of cobalt-based alloy in which a cobalt-based alloy portion is diffusion bonded to a base metal portion by interposing an insert metal between the cobalt-based alloy portion having granular or massive eutectic carbide dispersed in a matrix of metal microstructure and the base metal portion, wherein a layer of the insert metal is formed over the base metal portion, and the cobalt-based alloy portion is located over the insert metal layer.

Since the insert metal layer is formed between the cobalt-based alloy portion and the base metal, at the time of diffusion bonding of the cobalt-based alloy portion and the base metal, the cobalt-based alloy portion is less affected adversely by heat, so that granular or massive eutectic carbide exists in the cobalt-based alloy portion after bonding. Therefore, the cobalt-based alloy portion in the joint construction of cobalt-based alloy has excellent corrosion resistance and wear resistance.

A valve that is an application example to which the above-described joint construction of cobalt-based alloy is applied is characterized in that a valve seat provided in a valve casing has a cobalt-based alloy portion in which granular or massive eutectic carbide disperses in a matrix of metal microstructure and which is brought into contact with a valve element and a body portion installed to the valve casing; the cobalt-based alloy portion is diffusion bonded to the body portion by interposing an insert metal between the cobalt-based alloy portion and the body portion; and a layer of the insert metal is formed over the body portion, and the cobalt-based alloy portion is located over the insert metal layer. Since the insert metal layer is formed on the valve seat, and further the cobalt-based alloy portion exists over the insert metal layer, granular or massive eutectic carbide exists, as described above, in the cobalt-based alloy portion having been diffusion bonded, and net-form eutectic carbide does not exist therein. For this reason, the corrosion resistance and wear resistance of valve seat are improved, and thus the surface on which the valve seat and the valve element are in contact with each other is less liable to be subjected to corrosion damage due to dissolved oxygen in a fluid. Therefore, the frequency of valve maintenance is decreased, and the life of the valve is prolonged.

DETAILED DESCRIPTION OF THE PREFERRED EMBODIMENTS

A preferred embodiment of a joint construction of cobalt-based alloy in accordance with the present invention will be described with reference to FIG. 1. In the joint construction of this embodiment, a cobalt-based alloy layer 1 in which granular or massive eutectic carbide 2 disperses is joined to a base metal 37 via an insert metal layer 36.

Figure 2:
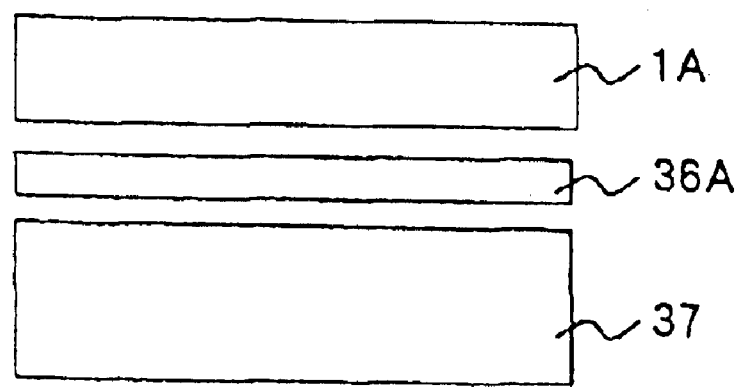
FIG. 2 is an explanatory view showing materials constituting the joint construction of the embodiment shown in FIG. 1.

This joint construction of a cobalt-based alloy is obtained as described below. The base metal 37 is S45C carbon steel. As shown in FIG. 2, a cobalt-based alloy material 1A is joined to the base metal 37. The cobalt-based alloy material 1A, having granular or massive eutectic carbide with a grain size not larger than 30 μm in a matrix of casting structure, contains 1.03 wt % C, 29.73 wt % Cr, 3.86 wt % W, 2.59 wt % Ni, 2.67 wt % Fe, 0.59 wt % Si, and 0.07 wt % Mo, the balance substantially being Co. When this cobalt-based alloy material 1A is joined to the base metal 37, an insert metal 36A is used. The insert metal 36A is a nickel-based alloy containing 4.5 wt % Si and 3.2 wt % B, the balance being Ni.

Also, the cobalt-based alloy material 1A is manufactured as described below. A cobalt-based alloy which has net-form eutectic carbide in a matrix of casting structure and contains 1.03 wt % C, 29.73 wt % Cr, 3.86 wt % W, 2.59 wt % Ni, 2.67 wt % Fe, 0.59 wt % Si, and 0.07 wt % Mo, the balance substantially being Co, is hot rolled at a temperature of 1050 to 1100° C., and thereby the eutectic carbide is made in a granular or massive form with a grain size not larger than 30 μm. Thus, the cobalt-based alloy material 1A is obtained.

The insert metal 36A with a thickness of about 40 μm is held between the base metal 37 and the cobalt-based alloy material 1A. Specifically, in the order shown in FIG. 2, the insert metal 36A is placed over the base metal 37, and the cobalt-based alloy material 1A is placed over the insert metal 36A. The cobalt-based alloy material 1A is pressed on the base metal 37 by its own weight. The solidus temperature of insert metal is about 980° C., and the liquidus temperature thereof is about 1040° C. The cobalt-based alloy material 1A is joined to the base metal 37 by liquid phase diffusion bonding. The liquid phase diffusion bonding was performed under the conditions of bonding temperature: 1100° C., retention time: 1 hour, degree of vacuum: $2 \times 10^{-4}$ torr, and pressure: 80 g/cm$^2$. The retention time means joining time taken for the liquid phase diffusion bonding to finish, during which the bonding temperature, degree of vacuum, and pressure are maintained in the above-described conditions. The insert metal 36A contains Si and B, which are melting point lowering elements, so that the melting point thereof is lower than that of the materials to be joined (cobalt-based alloy material 1A and base metal 37). However, during the time when the bonding temperature is maintained, Si and B diffuse into each of the materials to be joined and thus the melting point of the insert metal 36A rises, so that the solidification of the insert metal 36A proceeds during the liquid phase diffusion bonding.

Figure 1:
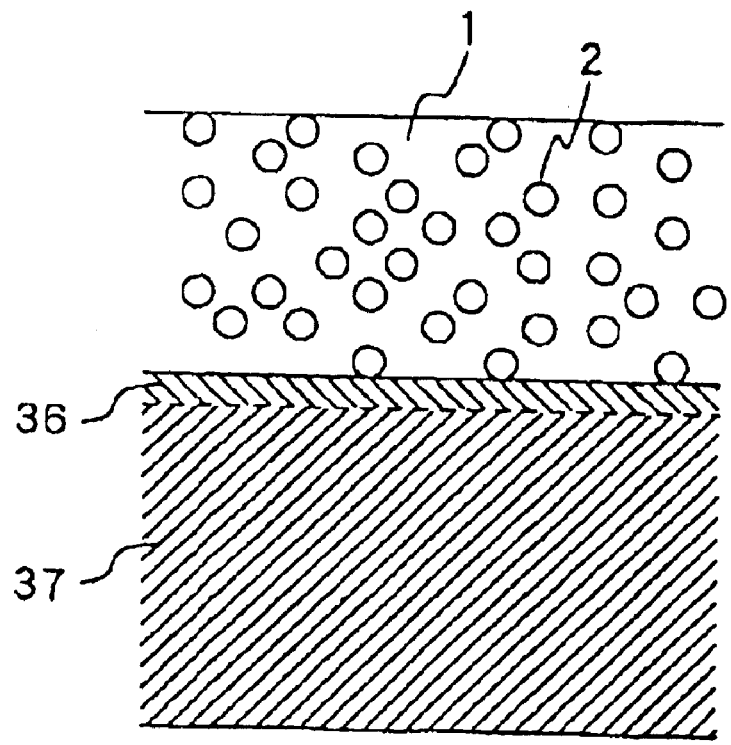
FIG. 1 is a longitudinal sectional view showing one preferred embodiment of a joint construction of cobalt-based alloy in accordance with the present invention.
Figure 3:
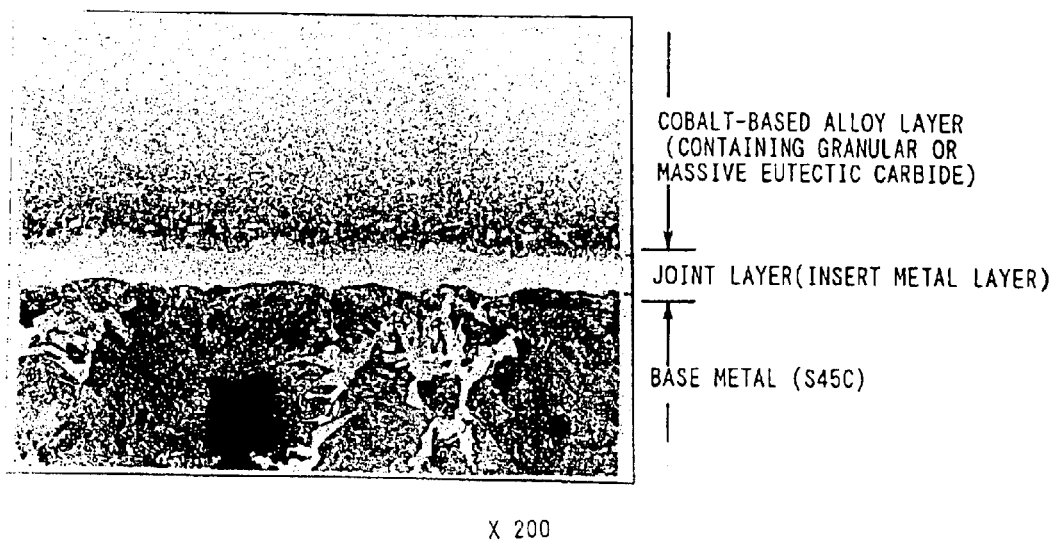
FIG. 3 is a microphotograph of a joint portion in the joint construction shown in FIG. 1.

The joint construction shown in FIG. 1 is obtained by the above-described liquid phase diffusion bonding. FIG. 3 is an optical microphotograph of a joint construction portion of cobalt-based alloy of this embodiment shown in FIG. 1. As is apparent from FIG. 3, in the joint construction portion of cobalt-based alloy of this embodiment, the insert metal layer (joint layer) 36 exists between the base metal 37 and the cobalt-based alloy layer 1. This cobalt-based alloy layer 1 contains granular or massive eutectic carbide.

Figure 4:
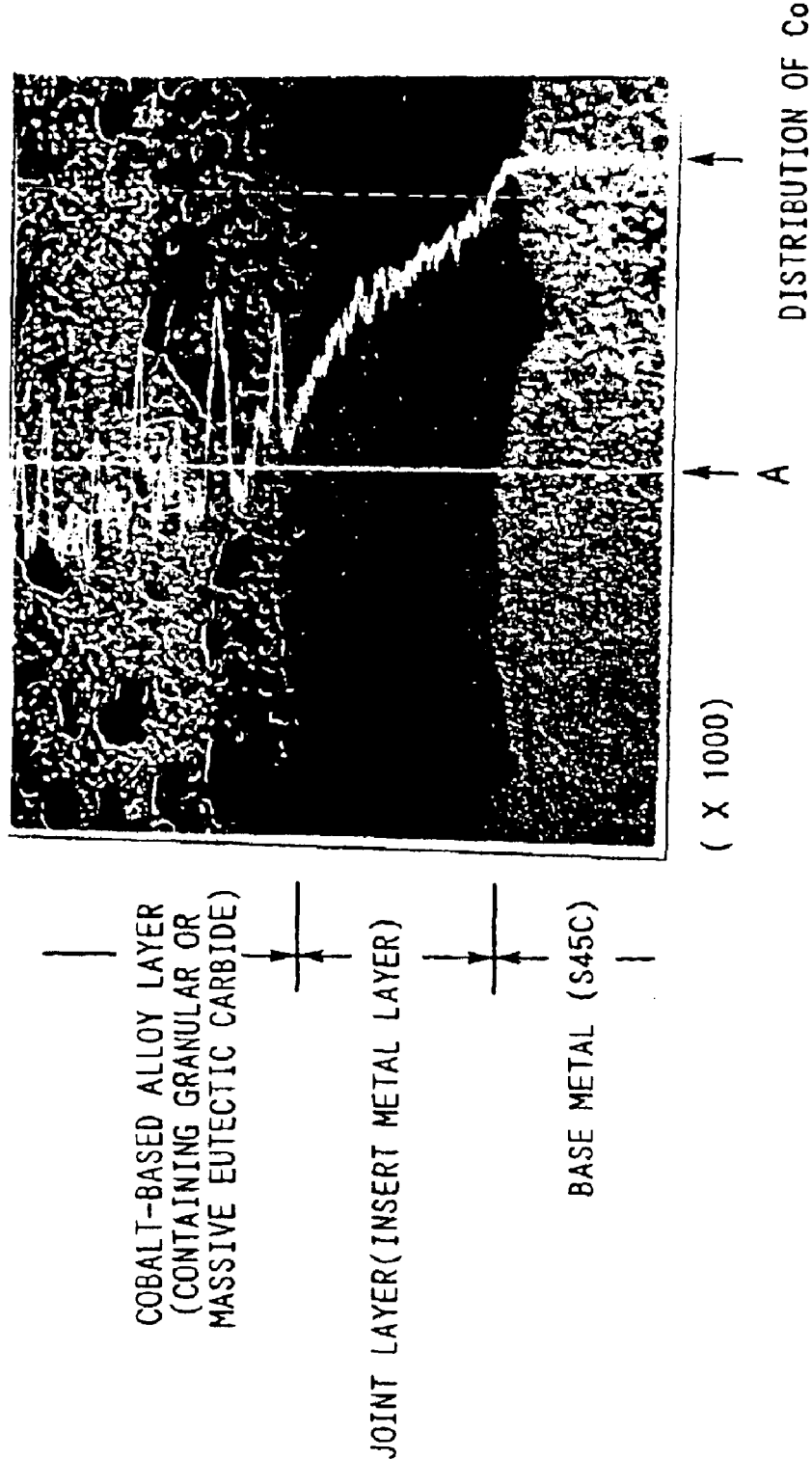
FIG. 4 is a SEM photograph showing the distribution of cobalt, which is a principal element of a cobalt-based alloy layer, in a joint portion in the joint construction shown in FIG. 1.
Figure 5:
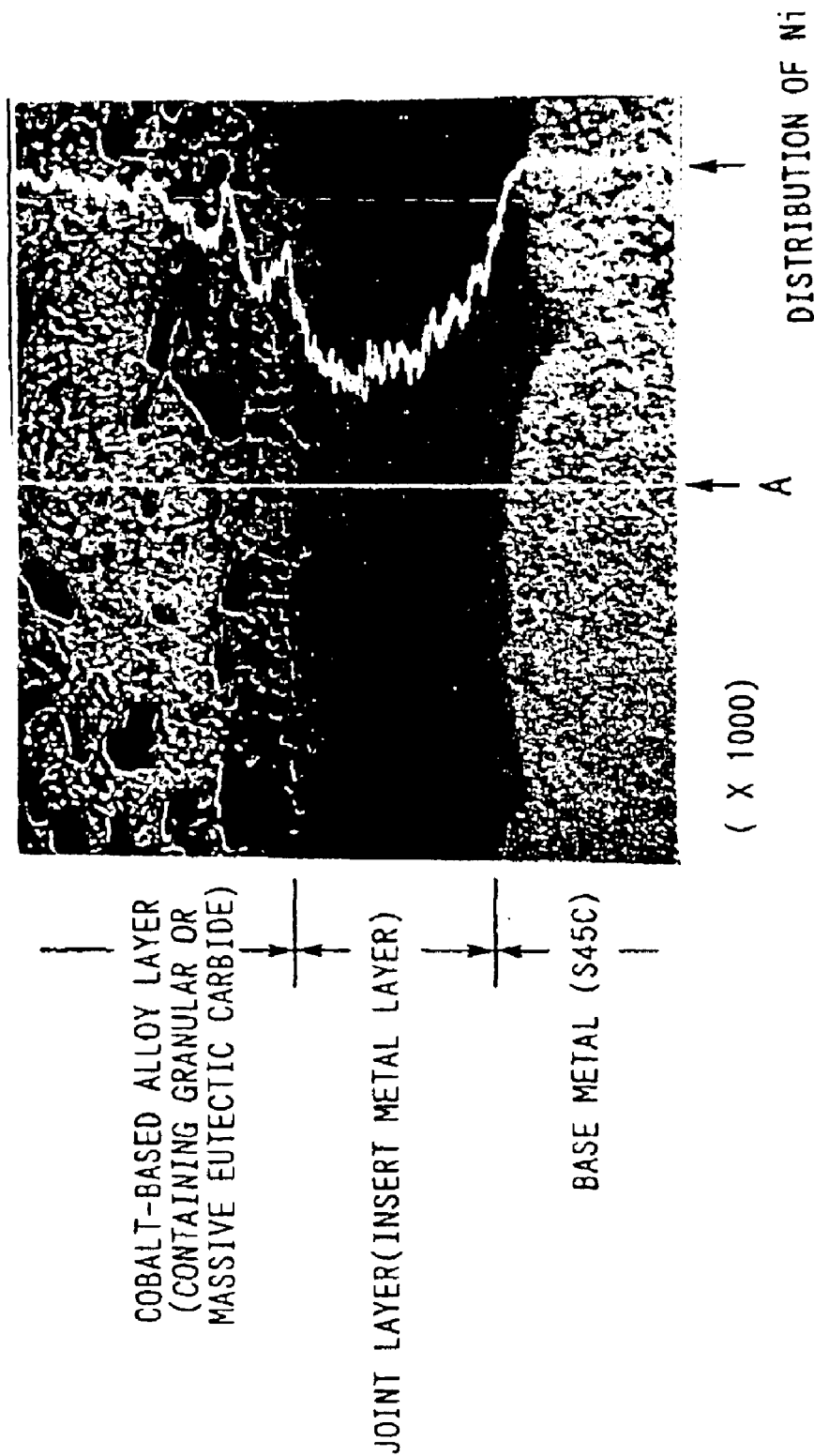
FIG. 5 is a SEM photograph showing the distribution of nickel, which is a principal element of an insert metal layer, in a joint portion in the joint construction shown in FIG. 1.
Figure 6:
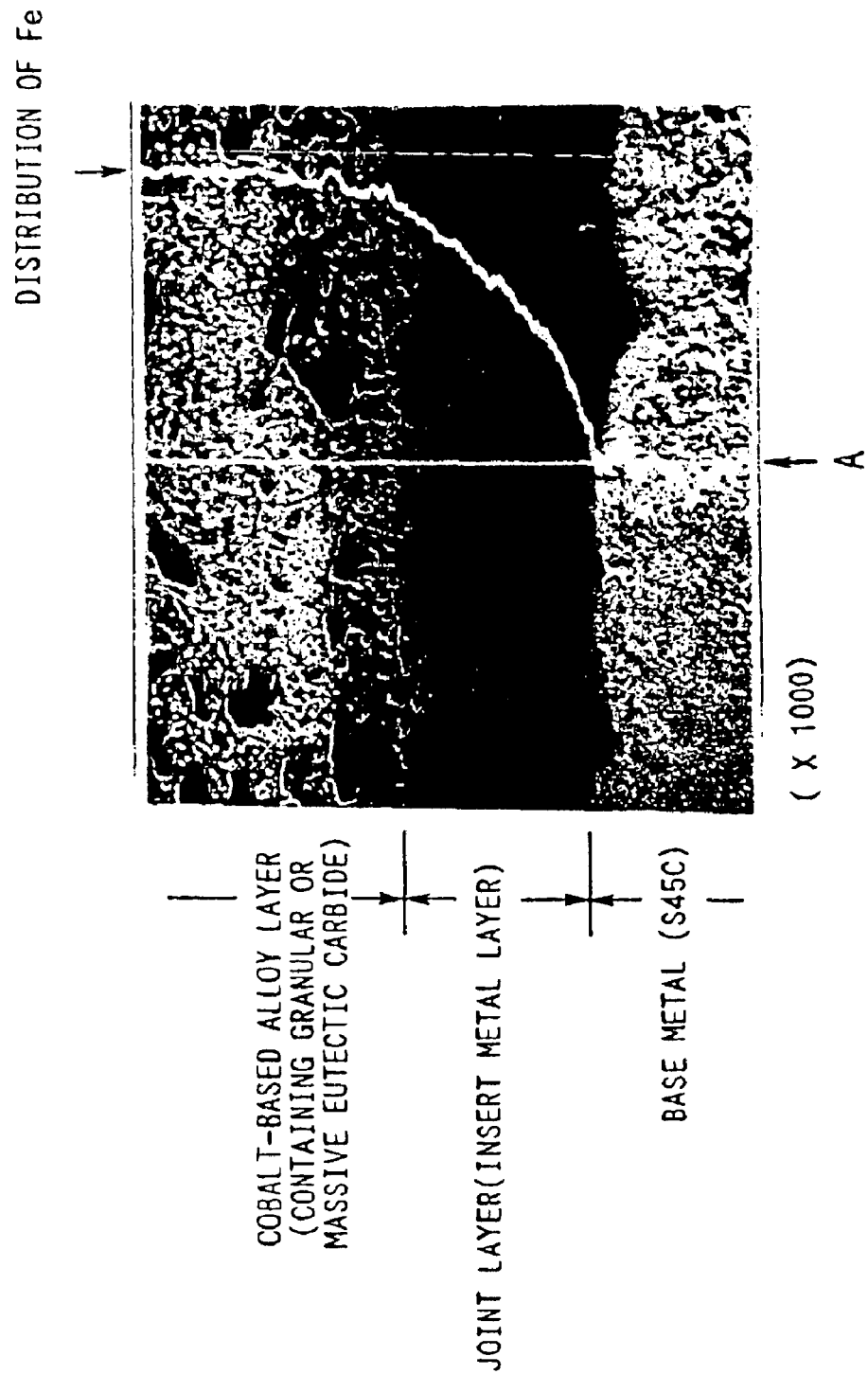
FIG. 6 is a SEM photograph showing the distribution of iron, which is a principal element of a base metal, in a joint portion in the joint construction shown in FIG. 1.

The distribution of principal elements in each layer in the cross section of the joint construction of this embodiment shown in FIG. 1 is analyzed using a scanning electron microscope (SEM). FIGS. 4, 5 and 6 are SEM photographs showing the analysis results. FIG. 4 shows the distribution of cobalt, which is a principal element of the cobalt-based alloy layer 1, in the position of line A. The distribution of cobalt is shown by a wavelike curve. The cobalt contained in the cobalt-based alloy material 1A is diffused into the insert metal layer (joint layer) 36 by the aforementioned liquid phase diffusion bonding, but is scarcely diffused into the base metal 37. FIG. 5 shows the distribution of nickel, which is a principal element of the insert metal layer 36, in the position of line A. The distribution of nickel is shown by a wavelike curve. The nickel contained in the insert metal 36A is scarcely diffused into the cobalt-based alloy layer 1 and the base metal 37 even by the aforementioned liquid phase diffusion bonding. FIG. 6 shows the distribution of iron, which is a principal element of the base metal 37, in the position of line A. The distribution of iron is shown by a wavelike curve. The iron contained in the base metal 37 is diffused into the insert metal layer (joint layer) 36, but is scarcely diffused into the cobalt-based alloy layer 1. The positions of line A in FIGS. 4, 5 and 6 are the same positions. The nickel contained in the insert metal 36A is scarcely diffused into the cobalt-based alloy layer 1 and the base metal 37 by the liquid phase diffusion bonding, but the silicon and boron contained in the insert metal 36A are diffused into the cobalt-based alloy layer 1 and the base metal 37. The cobalt-based alloy layer 1 and the base metal 37 contain Si and B diffused from the insert metal 36A at the time of liquid phase diffusion bonding, and the insert metal layer 36 contains Fe diffused from the base metal 37 and Co diffused from the cobalt-based alloy material 1A, so that the cobalt-based alloy layer 1 is firmly joined to the base metal 37 via the insert metal layer 36. The silicon and boron diffused from the insert metal 36A exist mainly in a portion near the insert metal layer 36 in the cobalt-based alloy layer 1 and the base metal 37.

A test piece was prepared for the joint construction of this embodiment obtained by the aforementioned liquid phase diffusion bonding, and a shearing test was conducted using the test piece. As a result, it was found that the shearing strength of the joint construction is about 36 kg/mm$^2$. Furthermore, the sheared portion was a portion of base metal (carbon steel), so that the integrity of the joint construction of this embodiment was verified.

For the joint construction of a cobalt-based alloy of this embodiment, the bonding temperature is 1100° C., being considerably lower than the melting points of the cobalt-based alloy material 1A and the base metal 37, and the retention time is also as short as 1 hour as described above, so that the insert metal layer 36 remains, and thus the cobalt-based alloy material 1A is not adversely affected thermally. Therefore, the cobalt-based alloy material layer 1 after being joined has granular or massive eutectic carbide with a grain size not larger than 30 μm like the cobalt-based alloy material 1A before being joined, so that it has corrosion resistance and wear resistance equal to those of the cobalt-based alloy material 1A. In the case where the bonding temperature rises to the melting point of the cobalt-based alloy material 1A and thus the cobalt-based alloy material 1A is melted, the granular or massive eutectic carbide is lost, and the eutectic carbide comes to have a continuous net form at the time of solidification. This is the state of the aforementioned raw material used to manufacture the cobalt-based alloy material 1A. The cobalt-based alloy in which eutectic carbide of continuous net form exists is inferior in corrosion resistance and wear resistance.

As described above, by changing the eutectic carbide from continuous net form to discontinuous granular or massive form, the corrosion resistance can be increased remarkably. The grain size of eutectic carbide should be not larger than 30 μm, preferably not larger than 10 μm. By dividing the eutectic carbide finely in this manner, the corrosion resistance in the Strauss test specified in JIS G0575 can be increased by a factor of about 300 as compared with the case of continuous net-form eutectic carbide.

In the above-described embodiment, the pressure, which is one of the conditions for liquid phase diffusion bonding, was set at 80 g/cm$^2$. The pressure has been reduced remarkably as compared with the pressure in diffusion welding; however, it is desirable to further reduce the pressure. Also, it is desirable that the joining time (the aforementioned retention time) be shorter than 1 hour. For this reason, using the cobalt-based alloy material 1A having the aforementioned composition, the insert metal 36A, and the base metal 37, the cobalt-based alloy material 1A was joined to the base metal 37 via the insert metal 36A by liquid phase diffusion bonding. Of the conditions for liquid phase diffusion bonding, the bonding temperature and the degree of vacuum were the same as the aforementioned conditions, but the retention time and the pressure were set at 30 minutes and 16 g/cm$^2$ respectively. The pressure of 16 g/cm$^2$ is almost equal to the own weight of the cobalt-based alloy material to be joined. The joint construction of cobalt-based alloy obtained under such conditions exhibited characteristics equivalent to those of the above-described embodiment. In this example, in which the retention time and the pressure were set at 30 minutes and 16 g/cm$^2$, respectively, the effects obtained by the above-described embodiment can be achieved.

It is desirable that the cobalt-based alloy having fine eutectic carbide with a grain size not larger than 30 μm be joined by diffusion bonding to the base metal 37 selected from carbon steel, low alloy steel, and stainless steel. It is especially desirable that it be joined by liquid phase diffusion bonding. Also, when liquid phase diffusion bonding is performed, it is desirable that joining be performed by inserting the insert metal formed of a nickel-based alloy containing Si and B between the base metal 37 and the cobalt-based alloy having granular or massive eutectic carbide.

As the insert metal, a metal containing a melting point lowering element such as boron (B), silicon (Si), or phosphorous (P) is preferably used. By diffusing the melting point lowering element such as B, Si and P into the materials to be joined, the pressure at the time of joining can be decreased and thus deformation due to joining can be kept less as compared with the case of solid phase diffusion bonding.

In order to change the eutectic carbide distributing continuously in a net form to a discontinuous granular or massive form, it is desirable to subject an alloy obtained by, for example, casting to plastic working such as hot forging and hot rolling, or to further subject it to heating treatment (annealing) in addition to the aforementioned plastic working. However, the method is not limited to the above-described methods.

Figure 7:
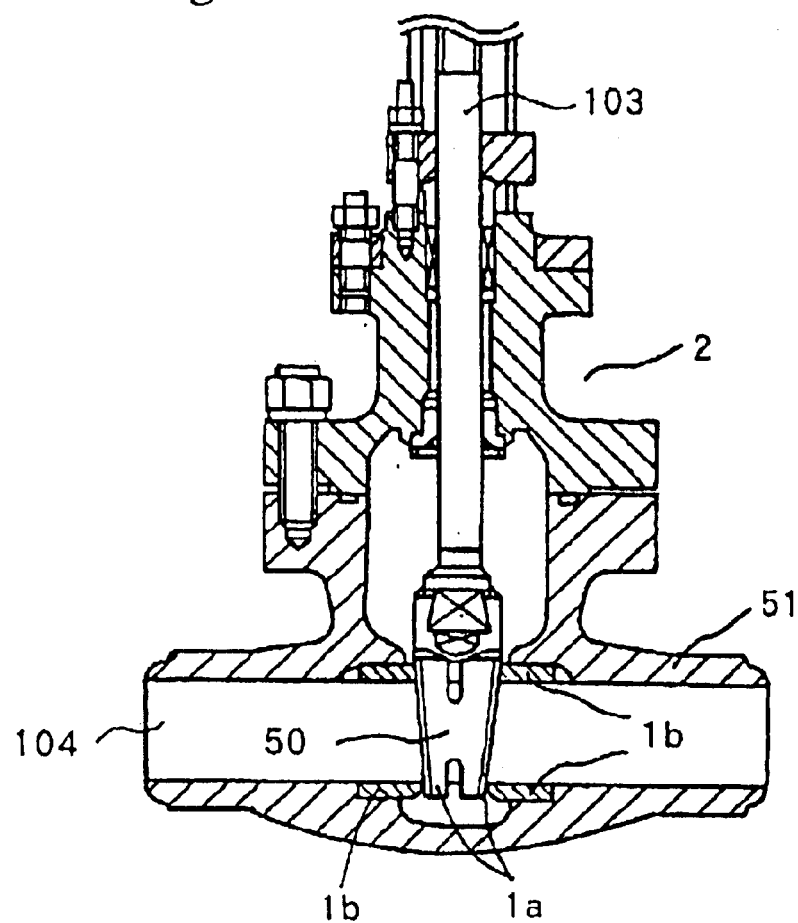
FIG. 7 is a longitudinal sectional view of a sluice valve in accordance with one embodiment of the present invention, to which a joint construction of cobalt-based alloy is applied.

A sluice valve in accordance with an embodiment of the present invention, to which the above-described joint construction of cobalt-based alloy is applied, will be described with reference to FIGS. 7, 8 and 9. A sluice valve 2 of this embodiment has a valve casing 51, and a valve rod 103 is inserted in the valve casing 51. A valve element 50 is installed to the valve rod 103. The sluice valve 2 is used in a dissolved oxygen atmosphere. An annular valve seat 1a is provided at both sides of the valve element 50. A passage 104 in which a fluid flows is formed in the valve casing 51. A pair of annular valve seats 1b are installed to the valve casing 51 so as to face the passage 104. By lowering the valve rod 103, the valve element 50 is lowered and inserted between the paired valve seats 1b, so that the valve seats 1a provided on the valve element 50 come into contact with the valve seats 1b and thereby the sluice valve 2 is closed. That is to say, the flow of fluid in the passage 104 is stopped. By raising the valve rod 103, the valve element 50 is also raised, so that the fluid flows in the passage 104.

Figure 8:
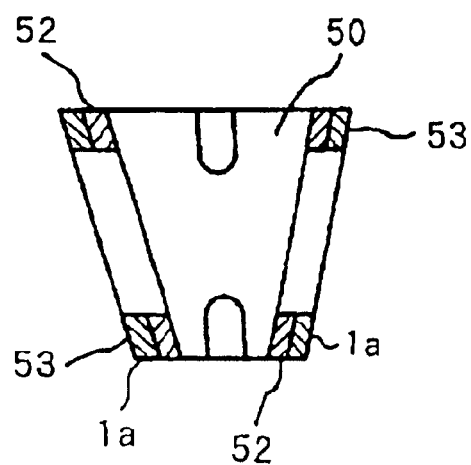
FIG. 8 is a longitudinal sectional view of a valve element shown in FIG. 7.
Figure 9:
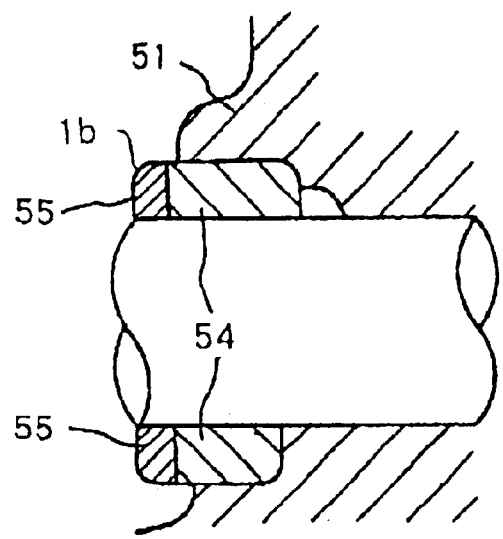
FIG. 9 is a longitudinal sectional view of a portion near a valve seat provided in a valve casing shown in FIG. 7.

As shown in FIG. 8, the valve seat 1a has an annular valve seat body 52, which is a body portion, and an annular cobalt-based alloy portion 53. The valve seat body 52 is installed to the valve element 50, and the cobalt-based alloy portion 53 is joined to the valve seat body 52 via an insert metal layer (not shown). As shown in FIG. 9, each of the valve seats 1b has an annular valve seat body 54, which is a body portion, and an annular cobalt-based alloy portion 55. The valve seat body 54 is installed to the valve casing 51, and the cobalt-based alloy portion 55 is joined to the valve seat body 54 via an insert metal layer (not shown). Both of the valve seat bodies 52 and 54 are SCPH2 (equivalent to S25C) castings. In the state in which the sluice valve 2 is closed, the cobalt-based alloy portion 53 of the valve seat 1a is in contact with the cobalt-based alloy portion 55 of the valve seat 1b. The valve seat bodies 52 and 54 in this embodiment correspond to the base metal 37 in the above-described joint construction of cobalt-based alloy material.

The cobalt-based alloy portions 53 and 55 are manufactured as described below. A cobalt-based alloy which has net-form eutectic carbide in a matrix of casting structure and contains 1.1 wt % C, 29.7 wt % Cr, and 4.5 wt % W is hot rolled at a temperature of 1050 to 1100° C., and thereby the eutectic carbide is made in a granular or massive form with a grain size not larger than 30 μm. A cobalt-based alloy ring with a thickness of 5 mm, which had been cut out of this cobalt-based alloy, is used as the cobalt-based alloy portions 53 and 55. The cobalt-based alloy portions 53 and 55 are made of a cobalt-based alloy having granular or massive eutectic carbide with a grain size not larger than 30 μm.

The cobalt-based alloy portion 53 is pressed on the valve seat body 52 with an insert metal being interposed therebetween by the own weight of the cobalt-based alloy portion 53. Also, the cobalt-based alloy portion 55 is pressed on the valve seat body 54 with an insert metal being held therebetween by the own weight of the cobalt-based alloy portion 55. Thus, the cobalt-based alloy portion 53 and the valve seat body 52, and the cobalt-based alloy portion 55 and the valve seat body 54 are subjected to liquid phase diffusion bonding in the state in which the insert metal being held therebetween under the conditions described below. Each of the insert metals is formed of a nickel-based alloy containing 4.5 wt % Si and 3.2 wt % B, the balance being Ni, and has a thickness of 40 μm. The solidus temperature of insert metal is about 980° C., and the liquidus temperature thereof is about 1040° C.

The aforementioned liquid phase diffusion bonding is performed under the conditions of bonding temperature: 1100° C., retention time: 1 hour, degree of vacuum: 2×10$^{-4}$ torr, and pressure: 80 g/cm$^2$. Since the insert metal contains Si and B, which are melting point lowering elements, the melting point thereof is lower than that of the materials to be joined (the valve seat body 52 and the cobalt-based alloy portion 53, and the valve seat body 54 and the cobalt-based alloy portion 55). However, during the time when the bonding temperature is maintained, Si and B contained in the insert metal diffuse into each of the materials to be joined and thus the melting point of the insert metal rises, so that the solidification of the insert metal proceeds during the bonding. Thus, the liquid phase diffusion bonding is completed.

When the cobalt-based alloy portion 53 is joined to the valve seat body 52 by liquid phase diffusion bonding, an insert metal layer is formed on the valve seat body 52, and a layer of the cobalt-based alloy portion 53 is formed on the insert metal layer. Also, when the cobalt-based alloy portion 55 is joined to the valve seat body 54 by liquid phase diffusion bonding, an insert metal layer is formed on the valve seat body 54, and a layer of the cobalt-based alloy portion 55 is formed on the insert metal layer. The layer of the cobalt-based alloy portion 53 and the layer of the cobalt-based alloy portion 55 have granular or massive eutectic carbide with a grain size not larger than 30 μm. After joining, the cross section of joint interface was observed. As a result, a joint defect such as a void was not found, and a good joint state was exhibited. For the sluice valve of this embodiment, since the surface of valve seat is composed of finely granular or massive eutectic carbide, the valve seat is less liable to be subjected to corrosion damage due to dissolved oxygen in the fluid than the valve seat composed of net-form eutectic carbide obtained by building-up or other methods. Also, since the coming-off of the matrix of casting structure is restrained, the progress of corrosion of valve seat is inhibited, so that the decrease in leakproofness is prevented. The layer of the cobalt-based alloy portion 53 and the layer of the cobalt-based alloy portion 55 also have high wear resistance. The sluice valve 2 of this embodiment has a long life and moreover a decreased frequency of maintenance because the valve seat thereof has excellent corrosion resistance and wear resistance.

Figure 10:
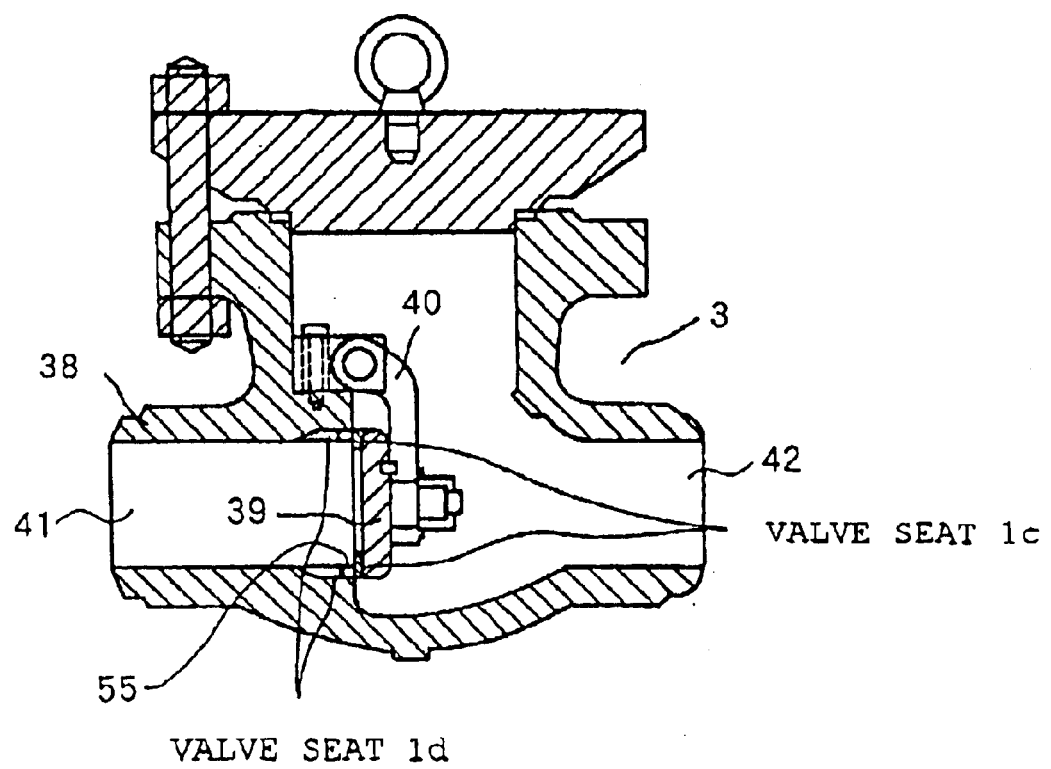
FIG. 10 is a longitudinal sectional view of a check valve in accordance with one embodiment of the present invention, to which a joint construction of cobalt-based alloy is applied.

A check valve in accordance with another embodiment of the present invention, to which the above-described joint construction of cobalt-based alloy is applied, will be described with reference to FIG. 10. A check valve 3 of this embodiment has a valve casing 38, and a valve element 39 fitted with a valve element support 40 is disposed in the valve casing 38. The valve element support 40 is attached rotatably to the valve casing 38. A valve seat 1d is installed to the valve casing 38 in a position to face such as a passage 41 formed in the valve casing 38. A valve seat 1c is installed to the valve element 39 so as to be opposed to the valve seat 1d. The check valve 3 allows a fluid to flow from the passage 41 toward a passage 42 in the valve casing 38, but when a flow of the fluid from the passage 42 toward the passage 41 (reverse flow) takes place, the reverse flow of fluid is checked by the valve element 39 pressed on the valve seat 1d. At this time, specifically, the valve seat 1c comes into contact with the valve seat 1d. Although not shown in the figure, the valve seat 1c has the annular valve seat body 52, which is a body portion, and the annular cobalt-based alloy portion 53, like the aforementioned valve seat 1a. The valve seat body 52 is installed to the valve element 39, and the cobalt-based alloy portion 53 is joined to the valve seat body 52 via an insert metal layer. Although not shown in the figure, the valve seat 1d has the annular valve seat body 54, which is a body portion, and the annular cobalt-based alloy portion 55, like the aforementioned valve seat 1b. The valve seat body 54 is installed to the valve casing 38, and the cobalt-based alloy portion 55 is joined to the valve seat body 54 via an insert metal layer (not shown). Both of the valve seat bodies 52 and 54 are SCPH2 (equivalent to S25C) castings. The valve seat bodies 52 and 54 in this embodiment correspond to the base metal 37 in the above-described joint construction of cobalt-based alloy.

The cobalt-based alloy portions 53 and 55 used for the check valve 3 are manufactured as described below. A cobalt-based alloy which had net-form eutectic carbide in a matrix of casting structure was hot forged at a temperature of 1050 to 1100° C. Thereby, a hard cobalt-based alloy which had eutectic carbide divided into a granular or massive form with a grain size not larger than 30 μm and contained 1.1 wt % C, 29.7 wt % Cr, and 4.5 wt % W, the balance being Co, was obtained. A ring with a thickness of 5 mm, which had been cut out of this cobalt-based alloy, was used as the cobalt-based alloy portions 53 and 55 used for the check valve 3. The cobalt-based alloy portions 53 and 55 are made of a cobalt-based alloy having granular or massive eutectic carbide with a grain size not larger than 30 μm.

The cobalt-based alloy portion 53 is pressed on the valve seat body 52 with an insert metal being held therebetween by the own weight of the cobalt-based alloy portion 53. Also, the cobalt-based alloy portion 55 is pressed on the valve seat body 54 with an insert metal being held therebetween by the own weight of the cobalt-based alloy portion 55. Thus, the cobalt-based alloy portion 53 and the valve seat body 52, and the cobalt-based alloy portion 55 and the valve seat body 54 are subjected to liquid phase diffusion bonding in the state in which the insert metal being held therebetween under the conditions described below. Each of the insert metals is formed of a nickel-based alloy containing CR wt %, 3 wt % Fe, 4.5 wt % Si, and 3.2 wt % B, the balance being Ni, and has a thickness of 40 μm. The solidus temperature of insert metal is about 970° C., and the liquidus temperature thereof is about 1090° C.

The aforementioned liquid phase diffusion bonding in this embodiment is performed under the conditions of bonding temperature: 1090° C., retention time: 1 hour, degree of vacuum: $2\times10^{-4}$ torr, and pressure: 50 g/cm$^2$. As in the case of the sluice valve 2, Si and B contained in the insert metal diffuse into each of the materials to be joined and thus the melting point of the insert metal rises, so that the solidification of the insert metal proceeds during the bonding. When the cobalt-based alloy portion 53 is joined to the valve seat body 52 by liquid phase diffusion bonding, an insert metal layer is formed on the valve seat body 52, and a layer of the cobalt-based alloy portion 53 is formed on the insert metal layer. Also, when the cobalt-based alloy portion 55 is joined to the valve seat body 54 by liquid phase diffusion bonding, an insert metal layer is formed on the valve seat body 54, and a layer of the cobalt-based alloy portion 55 is formed on the insert metal layer. The layer of the cobalt-based alloy portion 53 and the layer of the cobalt-based alloy portion 55 have granular or massive eutectic carbide with a grain size not larger than 30 μm.

After joining, the cross section of joint interface is observed. As a result, a joint defect such as a void was not found, and a good joint state was exhibited. Since the eutectic carbide of the cobalt-based alloy portion located on the surface of valve seat is fine, the occurrence of corrosion of eutectic carbide caused by dissolved oxygen is restrained by the check valve of this embodiment as well, so that the coming-off of the matrix of casting structure is restrained. Therefore, the corrosion of valve seat is inhibited, so that the decrease in leakproofness is prevented. Also in this embodiment, since as the insert metal, an alloy containing Cr having high corrosion resistance is used, the corrosion resistance in the joint portion, especially the corrosion resistance in the joint portion in an atmosphere of high-temperature and high-pressure water or water vapor containing much dissolved oxygen, can be maintained. Also, the layer of the cobalt-based alloy portion 53 and the layer of the cobalt-based alloy portion 55 also have high wear resistance. The check valve 3 of this embodiment has a long life and more over a decreased frequency of maintenance because the valve seat thereof has excellent corrosion resistance and wear resistance.

Figure 11:
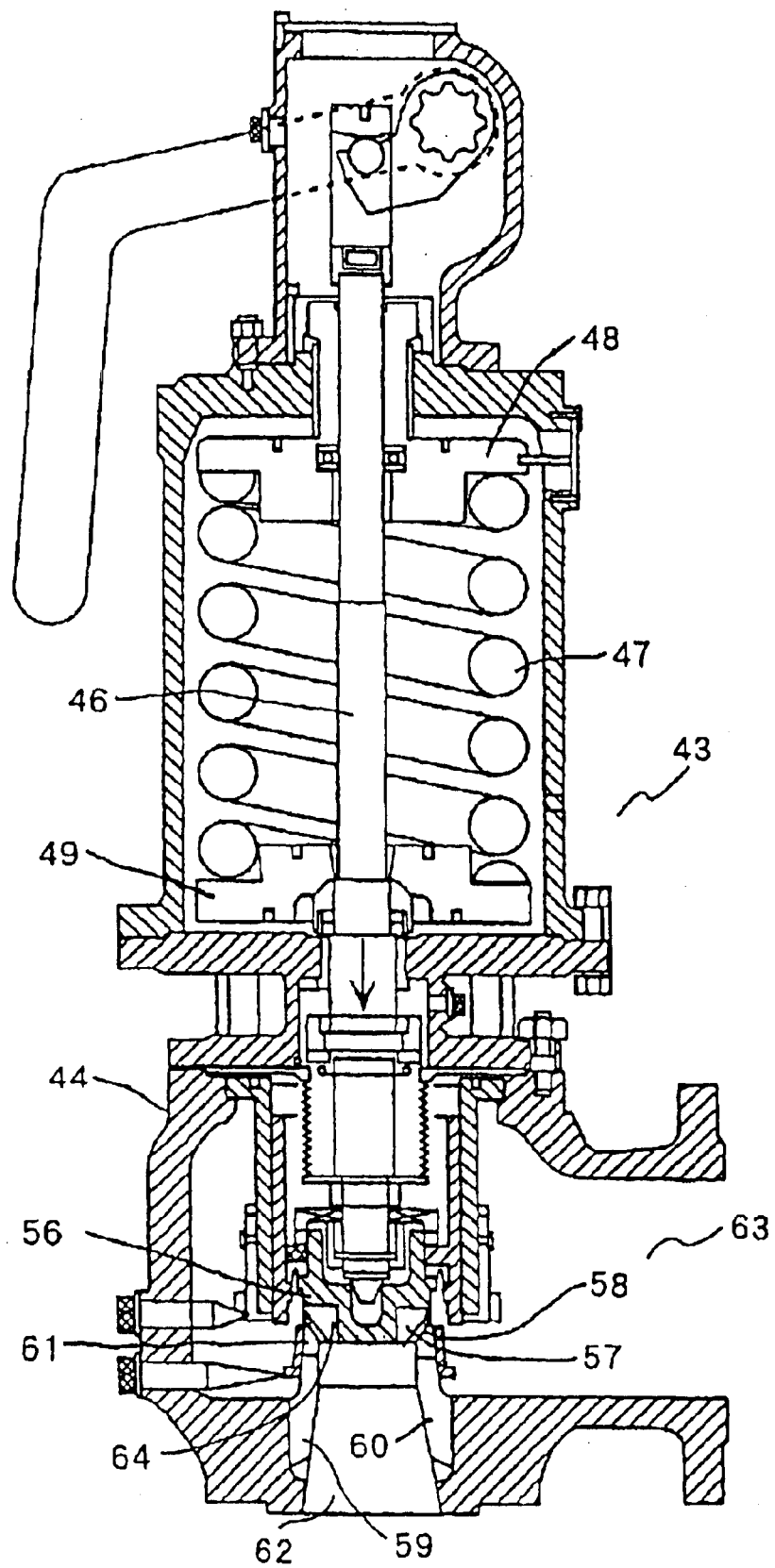
FIG. 11 is a longitudinal sectional view of a relief valve in accordance with one embodiment of the present invention, to which a joint construction of cobalt-based alloy is applied.

A relief valve in accordance with still another embodiment of the present invention, to which the above-described joint construction of cobalt-based alloy is applied, will be described with reference to FIG. 11. A relief valve 43 of this embodiment has a valve casing 44, and a valve element 56, which is pressed by a valve rod 46, is provided in the valve casing 44. The valve element 56 is not connected to the valve rod 46, and is merely in contact therewith. A coil spring 47 is disposed in the valve casing 44. The upper end of the coil spring 47 is in contact with a spring support 48 installed to the valve casing 44, and the lower end of the coil spring 47 is in contact with a spring support 49 installed to the valve rod 46. Specifically, the coil spring 47 is disposed between the spring support 48 and the spring support 49. An annular valve seat 60 is disposed in the lower part of the valve casing 44 so as to face a flow passage 62. The valve rod 46 presses the valve element 56 by the action of the coil spring 47, so that the valve element 56 is pressed on the valve seat 60. In this state, the flow of fluid from the flow passage 62 to the flow passage 63 is checked. When the fluid pressure increases to a value that overcomes the pressing force of the coil spring 47, the coil spring 47 is compressed by the fluid pressure, so that the valve element 56 is pushed up. Therefore, the fluid flows from the flow passage 62 toward the flow passage 63. The fluid with a high pressure in the flow passage 62 on the upstream side of the valve element 56 is discharged to the outside.

The valve seat 60 has an annular valve seat body 59 and an annular cobalt-based alloy portion 61, and although not shown in the figure, an insert metal layer exists between the valve seat body 59 and the cobalt-based alloy portion 61 as in the case shown in FIG. 1. The valve element 56 is also provided with an annular valve seat 64, and this valve seat 64 has an annular valve seat body 57 and an annular cobalt-based alloy portion 58. Although not shown in the figure, an insert metal layer exists between the valve seat body 57 and the cobalt-based alloy portion 58 as in the case shown in FIG. 1. Both of the valve seat bodies 57 and 59 are SCPH2 castings. The composition of each of the cobalt-based alloy portions 58 and 61 is the same as the composition of the cobalt-based alloy portion 53 of the sluice valve 2, and the cobalt-based alloy portions 58 and 61 also have granular or massive eutectic carbide with a grain size not larger than 30 μm. The composition of an insert metal, which defines the composition of the insert metal layer of the valve seats 60 and 64, is also the same as the composition of the insert metal used for the sluice valve 2. The cobalt-based alloy portion 58 and the cobalt-based alloy portion 61 are opposed to each other. In the state in which the insert metal is interposed between the valve seat body 57 and the cobalt-based alloy portion 58 and also the insert metal is interposed between the valve seat body 59 and the cobalt-based alloy portion 61, liquid phase diffusion bonding is performed under the same conditions as those for the sluice valve 2.

The relief valve 43 having the above-described joint construction of cobalt-based alloy can achieve the same effects as those of the sluice valve 2.

Figure 12:
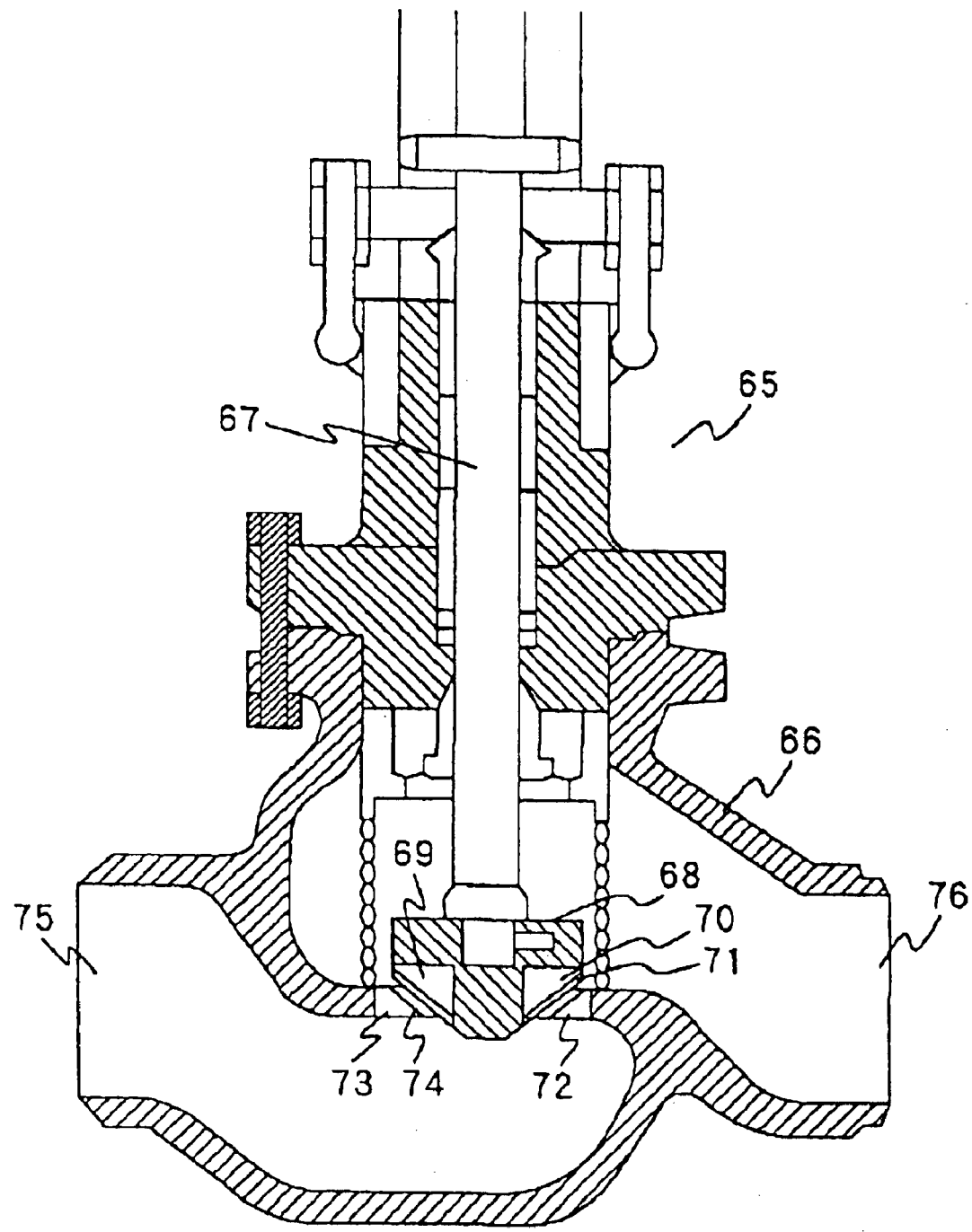
FIG. 12 is a longitudinal sectional view of a globe valve in accordance with one embodiment of the present invention, to which a joint construction of cobalt-based alloy is applied.

A globe valve in accordance with still another embodiment of the present invention, to which the above-described joint construction of cobalt-based alloy is applied, will be described with reference to FIG. 12. For the globe valve 65 of this embodiment, a valve rod 67 is disposed in a valve casing 66, and an annular valve seat 69 is installed to a valve element 68. The valve element 68 is provided in the lower end portion of the valve rod 67. An annular valve seat 72 is provided in the valve casing 66. When the valve element 68 separates from the valve seat 72 and is positioned above, a fluid flowing into a flow passage 75 of the valve casing 66 flows upward through the valve seat 72, and goes into a flow passage 76.

The valve seat 69 has an annular valve seat body 70 and an annular cobalt-based alloy portion 71, and although not shown in the figure, an insert metal layer exists between the valve seat body 70 and the cobalt-based alloy portion 71 as in the case shown in FIG. 1. The other valve seat 72 has an annular valve seat body 73 and an annular cobalt-based alloy portion 74. Although not shown in the figure, an insert metal layer exists between the valve seat body 73 and the cobalt-based alloy portion 74 as in the case shown in FIG. 1. Both of the valve seat bodies 69 and 73 are SCPH2 castings. The composition of each of the cobalt-based alloy portions 71 and 74 is the same as the composition of the cobalt-based alloy portion 53 of the sluice valve 2, and the cobalt-based alloy portions 71 and 74 also have granular or massive eutectic carbide with a grain size not larger than 30 μm. The composition of an insert metal, which defines the composition of the insert metal layer of the valve seats 69 and 72, is also the same as the composition of the insert metal used for the sluice valve 2. The cobalt-based alloy portion 71 and the cobalt-based alloy portion 74 are opposed to each other. In the state in which the insert metal is interposed between the valve seat body 70 and the cobalt-based alloy portion 71 and also the insert metal is interposed between the valve seat body 73 and the cobalt-based alloy portion 74, liquid phase diffusion bonding is performed under the same conditions as those for the sluice valve 2.

The globe valve 65 having the above-described joint construction of cobalt-based alloy material can achieve the same effects as those of the sluice valve 2.

Figure 13:
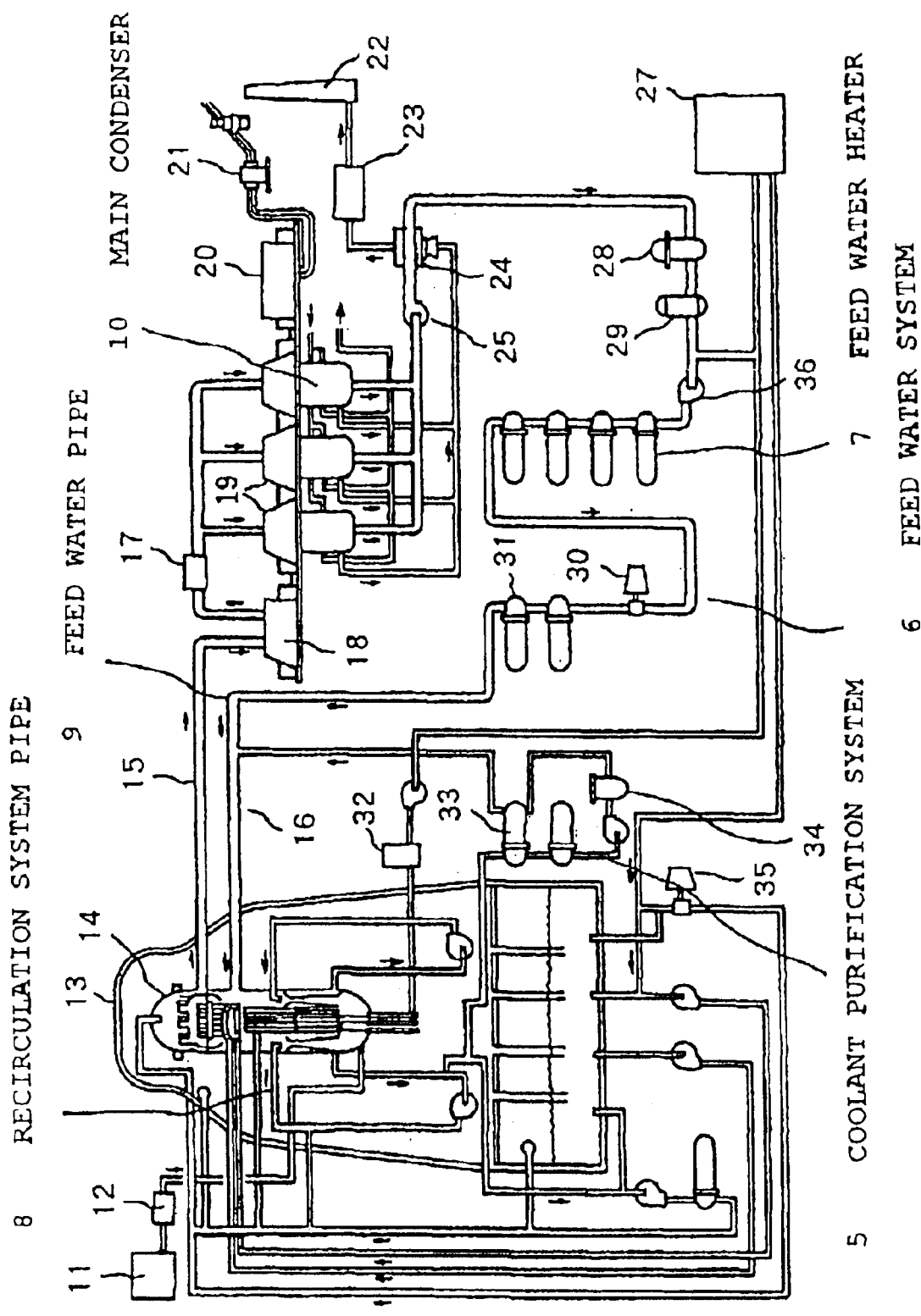
FIG. 13 is a schematic view of a boiling water nuclear power plant using the valves shown in FIGS. 7 and 10 to 13.

A schematic configuration of a boiling water nuclear power plant will be described with reference to FIG. 13. A coolant is heated by heat generated in a reactor core within a reactor pressure vessel 14, turning to high-temperature and high-pressure steam, and is introduced into a high pressure turbine 18 after passing through a main steam pipe 15 of a main steam system. Although not shown in the figure, the main steam pipe 15 is provided with the relief valve 43 shown in FIG. 11. The steam discharged from the high pressure turbine 18 is introduced into a low pressure turbine 19 after passing through a moisture separator 17. By the introduction of steam into the high pressure turbine 18 and the low pressure turbine 19, these turbines are rotated to drive a generator 20. The electricity generated by the generator 20 is introduced to a power transmission line after passing through a main transformer 21. The steam discharged from the high pressure turbine 18 and the low pressure turbine 19 is condensed into water by a main condenser 10. This water is returned as feed water into a reactor pressure vessel 14 by a feed water system 6 in which many valves (for example, the sluice valves 2 and the check valves 3) in which the joint construction of cobalt-based alloy shown in FIG. 1 is applied to the valve seat and valve element are provided. Specifically, the feed water discharged from the main condenser 10 is pressurized by a low pressure condensate pump 25, and then is sent to a condensate filter 28 and a condensate demineralizer 29 to be purified. Thereafter, the purified feed water is further pressurized by a high pressure condensate pump 36, and is sent to a low pressure feed water heater 7. The feed water having been heated by the low pressure feed water heater 7 is further pressurized by a feed water pump 30, and is heated by a high pressure feed water heater 31. Then, it is returned into the reactor pressure vessel 14 after passing through a feed water pipe 9. The reactor pressure vessel 14 is disposed in a reactor container 13. A reactor purification system 5 for purifying the coolant in the reactor pressure vessel 14 has a heat exchanger 33 and a filter demineralizer 34. A boric acid spray system has an SLC tank 11 and SLC pump 12. An offgas treatment system for purifying the radioactive gas separated by the main condenser 10 has an air ejector 24, an activated carbon packed tower 23, and a flue 22. Further, the boiling water nuclear power plant includes a recirculation system 8, a condensate storage tank 27, a control rod drive system 32, and a reactor core isolation cooling system 35. Although not shown in the figure, the recirculation system 8 is provided with the aforementioned sluice valve 2, and the reactor purification system 5, the control rod drive system 32, and the reactor core isolation cooling system 35 each are provided with a plurality of the aforementioned sluice valves 2 and check valves 3. The aforementioned globe valve 65 is also used in the aforementioned systems of the boiling water nuclear power plant. The aforementioned main steam system, reactor purification system 5, feed water system 6, recirculation system 8, control rod drive system 32, and reactor core isolation cooling system 35 are systems which are connected to the reactor pressure vessel 14, that is, a reactor incorporating a reactor core, and in which a coolant in the reactor flows.

The above-described boiling water nuclear power plant is provided with a large number of sluice valves 2, check valves 3, and globe valves 65, which have excellent corrosion resistance and wear resistance, as valves in a dissolved oxygen atmosphere. Therefore, the frequency of maintenance of these valves is decreased, and also the elution of cobalt (Co) caused by the corrosion of valve seat can be restrained. As a result, the generation of long-life Co isotopes caused by the inflow of Co having been eluted from the valve seat into the reactor core can be restrained, so that the exposure of operators of the nuclear power plant can be reduced. Therefore, the maintenance time required for the valves can be decreased remarkably, so that regular inspection work at the time of regular inspection of the boiling water nuclear power plant can be reduced, and not only the exposure dose can be decreased but also the work at the time of regular inspection of the nuclear power plant can be streamlined. The aforementioned sluice valve 2, check valve 3, relief valve 43, and globe valve 65 can be installed in a pipe in each system connected to a reactor incorporating a reactor even in a pressurized water nuclear power plant.

According to the present invention, since granular or massive eutectic carbide exists in the cobalt-based alloy portion after diffusion bonding, the cobalt-based alloy portion in the joint construction of cobalt-based alloy has excellent corrosion resistance and wear resistance.

What is claimed is:

1. A valve comprising a valve casing and a valve element disposed in said valve casing, said valve casing having a valve seat which comes into contact with said valve element, wherein said valve seat has a cobalt-based alloy portion in which granular or massive eutectic carbide disperses in a matrix of metal microstructure and which is brought into contact with said valve element, and a body portion installed to said valve casing, said cobalt-based alloy portion is diffusion bonded to said body portion by interposing an insert metal between said cobalt-based alloy portion and said body portion, and a layer of said insert metal is formed over said body portion, and said cobalt-based alloy portion is located over said insert metal layer.

2. A valve comprising a valve casing and a valve element disposed in said valve casing, said valve casing and said valve element each having a valve seat which comes into contact with each other, wherein said valve seats each have a cobalt-based alloy portion in which granular or massive eutectic carbide disperses in a matrix of metal microstructure and which is brought into contact with the other valve element, and a body portion installed to said valve casing, said cobalt-based alloy portion is diffusion bonded to said body portion by interposing an insert metal between said cobalt-based alloy portion and said body portion, and a layer of said insert metal is formed over said body portion, and said cobalt-based alloy portion is located over said insert metal layer.

3. The valve according to claim 2, wherein the grain size of said eutectic carbide is not larger than 30 $\mu$m.

4. The valve according to claim 2, wherein said body portion is formed of carbon steel, low alloy steel, or stainless steel.

5. The valve according to claim 2, wherein said cobalt-based alloy material portion contains 0.6 to 3% C, 2% or less Si, 25 to 32% Cr, 15% or less W, 0 to 3% Fe, 0 to 3% Ni, and 0 to 6% Mo by weight, the balance being Co and unavoidable impurities.

6. The valve according to claim 2, wherein said insert metal layer contains an element diffused from said body portion and cobalt diffused from said cobalt-based alloy portion.

7. The valve according to claim 6, wherein the grain size of said eutectic carbide is not larger than 30 μm.

8. The valve according to claim 6, wherein said cobalt-based alloy material portion contains 0.6 to 3% C, 2% or less Si, 25 to 32% Cr, 15% or less W, 0 to 3% Fe, 0 to 3% Ni, and 0 to 6% Mo by weight, the balance being Co and unavoidable impurities.

9. The valve according to claim 6, wherein said body portion is formed of carbon steel, low alloy steel, or stainless steel.

10. The valve according to claim 9, wherein said cobalt-based alloy material portion contains 0.6 to 3% C, 2% or less Si, 25 to 32% Cr, 15% or less W, 0 to 3% Fe, 0 to 3% Ni, and 0 to 6% Mo by weight, the balance being Co and unavoidable impurities.

11. The valve according to claim 2, wherein said body portion and said cobalt-based alloy portion contain an element diffused from said insert metal.

12. The valve according to claim 11, wherein the grain size of said eutectic carbide is not larger than 30 μm.

13. The valve according to claim 11, wherein said body portion is formed of carbon steel, low alloy steel, or stainless steel.

14. The valve according to claim 11, wherein said cobalt-based alloy material portion contains 0.6 to 3% C, 2% or less Si, 25 to 32% Cr, 15% or less W, 0 to 3% Fe, 0 to 3% Ni, and 0 to 6% Mo by weight, the balance being Co and unavoidable impurities.

15. The valve according to claim 11, wherein said insert metal layer contains an element diffused from said body portion and cobalt diffused from said cobalt-based alloy portion.

16. The valve according to claim 15, wherein the grain size of said eutectic carbide is not larger than 30 μm.

17. The valve according to claim 15, wherein said body portion is formed of carbon steel, low alloy steel, or stainless steel.

18. The valve according to claim 15, wherein said cobalt-based alloy material portion contains 0.6 to 3% C, 2% or less Si, 25 to 32% Cr, 15% or less W, 0 to 3% Fe, 0 to 3% Ni, and 0 to 6% Mo by weight, the balance being Co and unavoidable impurities.

* * * * *